United States Patent
Czarnocki

(10) Patent No.: US 7,107,854 B1
(45) Date of Patent: Sep. 19, 2006

(54) MEDIA ISOLATED ABSOLUTE PRESSURE SENSOR

(75) Inventor: Walter Czarnocki, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 9 days.

(21) Appl. No.: 11/078,974

(22) Filed: Mar. 10, 2005

(51) Int. Cl.
*G01L 13/02* (2006.01)
*G01L 13/06* (2006.01)

(52) U.S. Cl. .......................................... 73/720; 73/721
(58) Field of Classification Search ................ 73/708, 73/719, 720, 721, 716, 717
See application file for complete search history.

(56) References Cited

U.S. PATENT DOCUMENTS

| 4,131,088 A | 12/1978 | Reddy |
| 5,193,393 A * | 3/1993 | Czarnocki ................ 73/708 |
| 5,471,884 A | 12/1995 | Czarnocki et al. |
| 6,051,853 A | 4/2000 | Shimada et al. |

FOREIGN PATENT DOCUMENTS

| JP | 62252176 A | 11/1987 |
| JP | 01172719 A | 7/1989 |

* cited by examiner

*Primary Examiner*—Edward Lefkowitz
*Assistant Examiner*—Andre Allen
(74) *Attorney, Agent, or Firm*—Brian M. Mancini; Gary J. Cunningham

(57) ABSTRACT

A method and media-isolated absolute pressure sensor apparatus includes a first sensor (101) to measure a pressure difference between an isolated media (P1) and a second media (Pa). A second sensor (103) measures an absolute (relative to vacuum) pressure of the second media (Pa). Each sensor (101, 103) has its own offset and slope response. An equalizer (217, 219) matches the slopes of the sensors (101, 103), wherein a summing circuit (225) can add the substantially same slope outputs to provide an output signal (227) indicative of an absolute pressure measurement of the isolated media (P1). Offset and temperature compensation of each sensor can also be provided.

13 Claims, 3 Drawing Sheets

MEDIA ISOLATED ABSOLUTE PRESSURE SENSOR

FIELD OF THE INVENTION

The present invention is generally directed to the field of pressure sensors, and specifically for media-isolated absolute pressure sensors.

BACKGROUND OF THE DISCLOSURE

In contemporary automotive systems it is often desirable to measure an absolute pressure at a location. For instance, it is desirable to measure a pressure across a sharp edge orifice in an EGR (exhaust gas reflow) system in order to determine flow. Often, as in this case, the media can be very harsh. Because of this adverse environment, isolation from the medium, here exhaust gas, is desirable to ensure that the sensor, typically semiconductor based, survives and functions properly over a long period of time.

Absolute pressure sensors are normally built with the vacuum inside a sensor's cavity, and have a sensed pressure applied to their top side. This side can be identified as the one that contains things for interconnection (metal wire bonding pads, wire bonds etc). As can be imagined the top side is sensitive to the chemical/physical contamination which can adversely affect operation of the sensor, causing severe degradation in sensors accuracy or even catastrophic failures.

One prior art solution to protect the sensor's top side is to use special semiconductor films (for example, nitride passivation) and outside films or gels. This kind of protection has its limitations. For example, extreme media, such as vehicle's exhaust gas, can still harm the sensing element despite being protected.

Another prior art approach to isolate the media from the sensor is using stainless steel diaphragms for sensing a pressure coupled by oil to a conventional semiconductor based pressure sensor. The stainless steel diaphragm provides the necessary isolation between the harsh media and the pressure sensor, and the oil provides the transfer of pressure to the pressure sensor. The oil medium used in this approach adds error to a pressure measurement because in the manufacturing process is difficult if not impractical to eliminate all air pockets. These air pockets add error to the pressure transfer between the stainless steel diaphragm sensing the media harsh pressure and the actual pressure sensor. Also, the oil pressure transfer performance is degraded with increasing temperature and time because of changes in oil viscosity and leakage of oil. Furthermore, using the oil filled approach is difficult to manufacture because the oil needs to be hermetically sealed between the stainless steel diaphragm and the pressure sensor.

Another prior art approach isolated the media isolated by enclosing a differential pressure sensor in the hermetically sealed vacuum can. This way a reference pressure is kept at zero whereas sensed pressure is applied from sensors back side. The back side of the sensing element, composed of the sealed silicon is not affected by the sensed media. However, this kind of solution is expensive, leak prone and not well suited for mass production.

What is needed is an improved media-isolated absolute pressure sensor, that is more accurate, easier to manufacture, low cost, and has an improved field performance over time and temperature variations.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF EMBODIMENTS OF THE INVENTION

The present invention describes a method and apparatus using two sensing elements, differential and absolute. Absolute sensing is achieved by proper signal conditioning. A sensed absolute pressure is applied to the differential sensor back side, thus media isolation is achieved and harsh media can be applied thereto. As a result, the present invention provides an absolute pressure sensor that is more accurate, easier to manufacture, low cost, and has an improved field performance over time and temperature variations.

A media-isolated absolute pressure sensor apparatus and corresponding method combines a first signal provided by a first pressure sensor, indicative of a difference between a first pressure and second pressure applied across the first pressure sensor, and a second signal provided by a second pressure sensor, indicative of a difference between the second pressure and a substantial vacuum applied across the second pressure sensor. The first and second signals are combined to form an absolute pressure sensor. Responsive to a pressure span, or a range of pressures, the first signal has a slope response different than a slope response of the second. signal. This is particularly evident where one sensor is a differential sensor and the other an absolute sensor, unlike the prior art where similar type differential sensors are used. An equalizer (slope adjustment) circuit enables an adjustment of the slope response of the first signal to correspond to the slope response of the second signal, and provides a slope adjusted first signal dependent on the adjusted slope response. A summing circuit provides an output signal dependent on the slope adjusted first signal and the second signal, where the output signal is indicative of an absolute pressure sensed between the first pressure sensor and the second pressure sensor, which is relative to a vacuum, making the system an absolute pressure sensor.

Features of the present invention include providing a structure that enables the combining of two pressure sensors to form a absolute pressure sensor that has its critical elements isolated from harsh media. Furthermore, the structure enables compensation of span and offset errors associated with each sensor. Given this teaching, this structure can be easily expanded to include more than two sensors. These and other benefits of the present invention will be better appreciated with a review of the accompanying figures.

Figure 1:
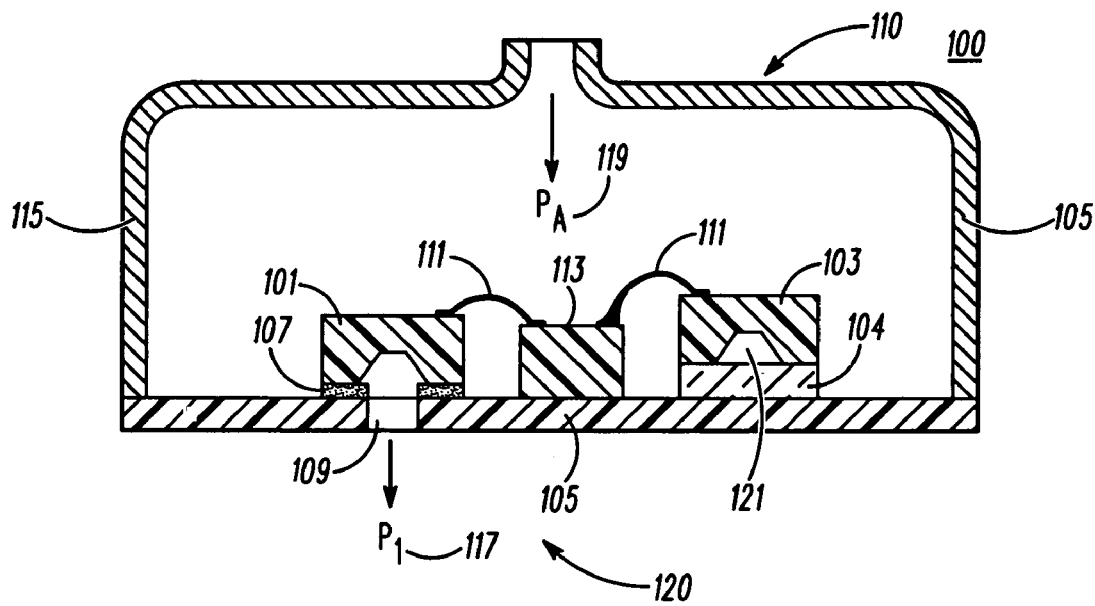
FIG. 1 is a cross-sectional view of a first and second pressure sensor both mounted on a common assembly, in accordance with the invention.

FIG. 1 is a cross-sectional view of a first and second pressure sensor both mounted on a common assembly, in accordance with the present invention. A first pressure sensor 101 and second pressure sensor 103 are both mounted in a common sensor assembly 100. Preferably, these pressure sensors 101 and 103 are constructed of silicon and are of the piezo-resistive type. The first pressure sensor 101 is affixed to the housing 105 over a port 109. This can be accomplished using a thin layer of adhesive 107 (e.g. RTV adhesive), or by other means, that is disposed on the housing, such as a plastic, ceramic or metal housing, and wherein the sensor 101 is then applied to the adhesive. Alternatively, the sensor can be electrostatically bonded to a glass pedestal disposed on the housing, and the glass pedestal bonded to the 105 using soldering or alternatively using an adhesive 107. A bond wire 111 electrically connects the sensor 101 to a signal processing circuit 113 that is also bonded to the housing. It should be noted that there are actually several bond wires but one is shown for clarity.

The second pressure sensor 103 is anodically (electrostatically) bonded under a vacuum to a glass or silicon pedestal 104 to encapsulate a substantial vacuum 121 therewithin. The pedestal 104 is then affixed to the housing 105, using any one of various techniques described herein or known in the art. For example, the pedestal 104 can affixed to the housing 105 using a thin layer of adhesive. The type of adhesive or bonding technique used should be chosen to provide a permanent bond to whatever the material of the housing 105 is used. A bond wire 111 electrically connects the second sensor 103 to a signal processing circuit 113 that is also bonded to the housing. It should be noted that there are actually several bond wires but one is shown for clarity.

The above-described structure is encapsulated in a housing 105. The housing 105 could be a hermetically sealed housing. However, the present invention is most economically applied where the housing is open to atmosphere (PA), and therefore the housing can be made of a low cost thermoset or thermoplastic. Indeed the entire housing need only consist of the base portion. Reference number 110 indicates an unprotected side of the sensor assembly 100, and reference number 120 indicates a protected, or media-isolated side of the sensor assembly 100. The unprotected side 110 is considered unprotected because if the harsh media present on the protected side 120 was exposed to the bond wire 111 it would chemically attack it and the bond wire would rapidly deteriorate and fail. The protected side 120 of the sensor assembly is considered protected because the port will be sealed and isolated to the harsh media to be measured. The unprotected side 110 of the both pressure sensors is not exposed to the harsh media.

A first pressure P1 117, is applied to pressure port 109 on the protected side 120 of the first pressure sensor 101. A second, typically ambient, pressure $P_A$ 119, is provided on the unprotected side 110 of the sensor assembly and is common to both the first and second pressure sensors 101 and 103. A substantial vacuum 121 is contained within the second sensor. A signal processing circuit 113 used to combine and process outputs from the two pressure sensors 101 and 103 as detailed in FIGS. 2 and 3. The circuit 113 will also have connections external to the package (not shown) to output the absolute pressure signal to other circuits, as needed.

Figure 2:
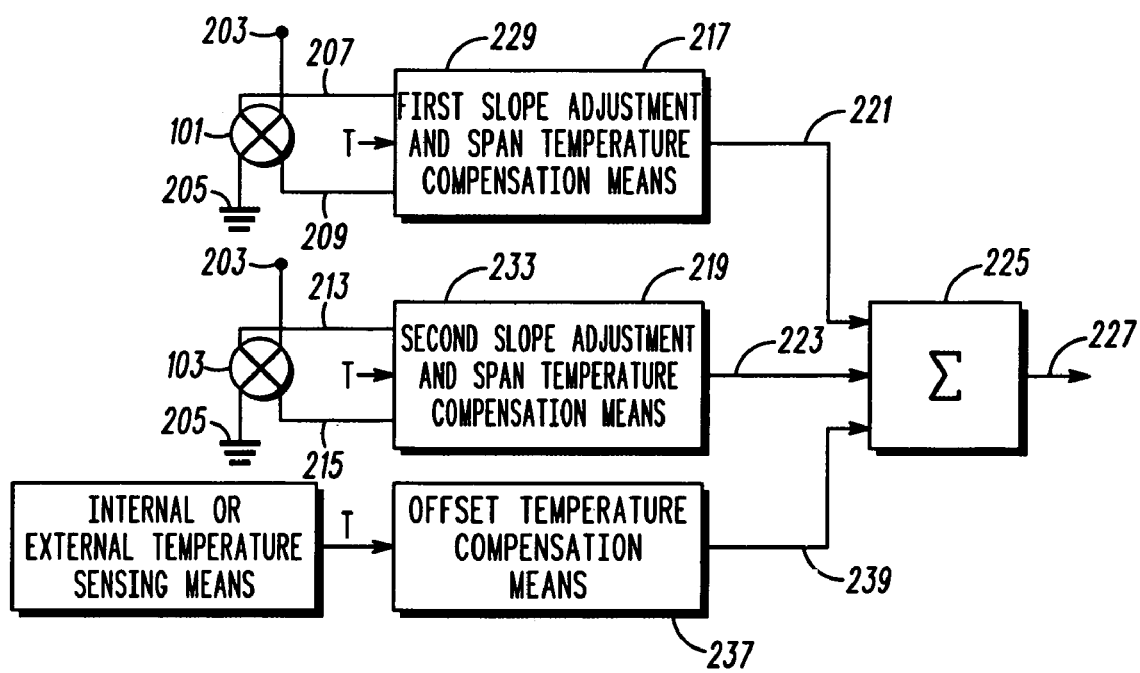
FIG. 2 is a system block diagram illustrating a structural relationship used to convert signals provided by the pressure sensors shown in FIG. 1 to form an absolute pressure sensor.
Figure 3:
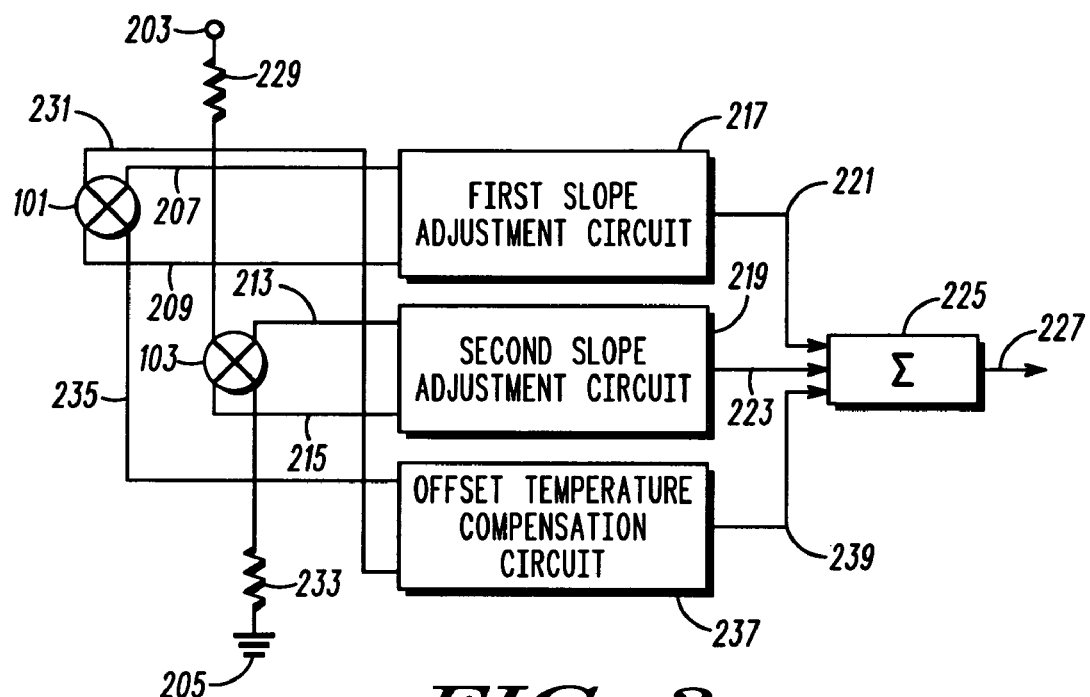
FIG. 3 is a system block diagram illustrating an alternate embodiment of a structural relationship used to convert signals provided by the pressure sensors shown in FIG. 1 to form an absolute pressure sensor.

FIGS. 2 and 3 are system block diagrams illustrating alternate relationships used to convert signals provided by the pressure sensors 101 and 103 shown in FIG. 1 to form a absolute pressure sensor that provides an output signal 227 whose response will be dependent on a sum of the first sensor pressure ($P_1-P_A$) and the second sensor pressure ($P_A-0$). The sum provides an absolute pressure $P_1$ since the sum is now referenced to a vacuum. It should be noted that the circuitry representing the structure shown in FIGS. 2 and 3 can be physically combined on the signal processing circuit 113 of FIG. 1.

Figure 4:
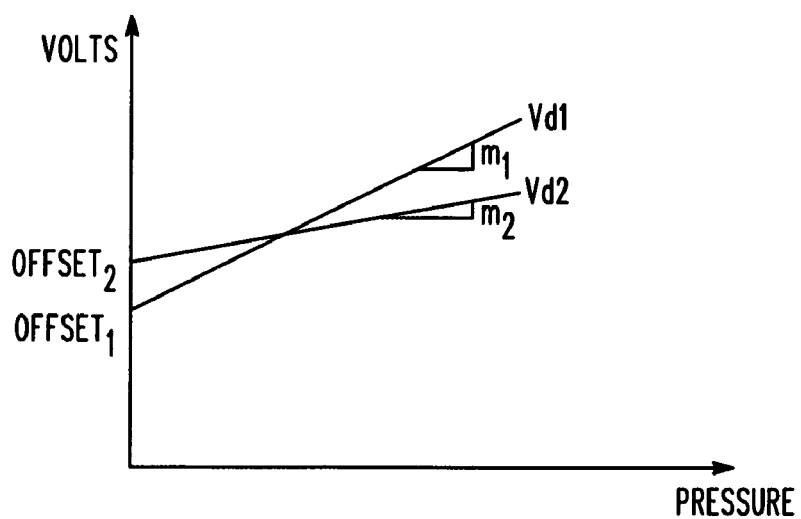
FIG. 4 is a graphical representation of the response slopes of the sensors.

As pressure $P_1$ 117 and $P_A$ 119 are applied to the sensor assembly 100, the piezo-resistive device of the first pressure sensor 101 outputs a first signal 207, 209 indicative of a difference between the first pressure $P_1$ 117 and the second pressure $P_A$ 119 applied across the first pressure sensor 101. The piezo-resistive device of the second pressure sensor 103 provides a second signal 213, 215 indicative of a difference measurement between the second pressure $P_A$ 119 and vacuum ($P_A-0$) applied across the second pressure sensor 103, resulting in an absolute measurement of $P_A$. Ordinarily these two signals 207, 209 and 213, 215 have different slopes over a pressure span because the present state of the art manufacturing processes do not allow the manufacture of sensors that have perfectly identical slopes. In addition, the differential sensor 101 will be subject to a different pressure span than the absolute pressure sensor 103. Thus over a range of pressure the first signal 207, 209 responds with a slope and over the a different range of pressure the second signal 213, 215 provided by the second pressure sensor 103 responds with a slope different than the slope provided by the first pressure sensor 101 (see FIG. 4). An important step in synthesizing the output signal 227 is the matching of the slope response of the two signals 207, 209 and 213, 215 provided by the two pressure sensors 101, 103.

An equalizer circuit (slope adjustment circuit) 217 conditions the first pressure sensor signal 207, 209 and provides a slope adjusted first signal 221. Another equalizer (slope adjustment) circuit 219 conditions the second pressure sensor signal 213, 215 and provides a slope adjusted second signal 223. In a minimal implementation, only the first slope adjustment circuit 217 is necessary because the slope of the first pressure sensor signal 207, 209 need only be adjusted to match the slope of the second pressure sensor signal 213, 215, so the second pressure sensor signal 213, 215 slope can be fixed. In this case, the slope response of the slope adjusted first signal 221 is adjusted to correspond to the slope response of the second pressure sensor signal 213, 215. In a preferred embodiment, the slope of the second pressure sensor signal 213, 215 can also be adjusted and a slope adjusted second signal 223 is provided from the slope adjustment circuit 219, to provide another degree of freedom in manufacturing the sensor 100.

Next the slope adjusted first signal 221 is added with the slope adjusted second signal 223 by a summing circuit 225. To understand the relevant aspects of combining the slope adjusted first signal 221 and the slope adjusted second signal 223, a brief review of equations determining the combination will be reviewed as follows with respect to FIGS. 1 and 4.

The response of the slope adjusted first signal 221 can be expressed as:

$$V_{d1} = \text{offset}_1 + m_1(P_1 - P_A)$$

where $V_{d1}$ is the output signal of the first sensor (in this case a voltage), $\text{offset}_1$ is a pressure independent (constant) term of the slope adjusted first signal 221 derived from the first pressure sensor 101, and $m_1$ is a pressure slope of the slope adjusted first signal 221 derived from the first pressure sensor 101. $P_1 - P_A$ is a differential pressure applied across the first pressure sensor 101 with $P_1$ 117 applied from the protected side 120 and $P_A$ 119 applied from the unprotected side 110.

The response of the slope adjusted second signal 223 is described as:

$$V_{d2} = \text{offset}_2 + m_2(P_A - 0)$$

where $V_{d2}$ is the output signal of the second sensor (again a voltage in this example), $\text{offset}_2$ is a pressure independent (constant) term of the slope adjusted second signal 223 derived from the second pressure sensor 103, and $m_2$ is a pressure slope of the slope adjusted second signal 223 derived from the second pressure sensor 103. $P_A - 0$ is a differential pressure applied across the first pressure sensor 103 with $P_A$ 119 applied from the unprotected side 110 against the vacuum 121, resulting in an absolute pressure measurement.

If an adjustment is made in such a way that $m_1 = m_2 = m$, then the adding done by the summing circuit 225 of the slope adjusted first signal 221 and the slope adjusted second signal 223 will produce resultant signal $V = V_{d1} + V_{d2}$ that is dependent on the first pressure P1 117 relative to vacuum. In addition, signal V is completely independent to the second pressure Pa 119 which is common to the first pressure sensor 101 and second pressure sensor 103. Thus a absolute pressure sensor that responds to the protected side 120 pressures only is created. This deterministic result can be expressed in the following equation.

$$V = V_{d1} + V_{d2} = \text{offset}_1 + \text{offset}_2 + m(P_1 - 0)$$

As is indicated above, the summing circuit 225 provides the necessary addition of the slope adjusted first signal 221 and the slope adjusted second signal 223. In addition, the summing circuit 225 can be coupled to an offset temperature compensation circuit 237 which allows temperature compensation of the offset term of both pressure sensors 101 and 103 at the same time. Furthermore, the summing circuit 225 possesses means for adjustment of the total circuit gain and offset at a reference temperature.

An additional component of the block diagrams shown in FIGS. 2 and 3 is a voltage span temperature compensation circuit comprising a network 229 and a network 233 coupled to each of the first and second pressure sensors 101, 103. These can include resistors coupled between power supply signals 203, 205, as shown in FIG. 2 or other temperature compensation networks as shown in FIG. 3. The voltage span is the span of voltage that is exhibited between the lowest and highest pressures that can be seen by the sensor. The span temperature compensation circuit 203, 229, 233, and 205 provides span temperature compensation for the first and second pressure sensors 101, 103 at the same time. Signals present at reference numbers 231 and 235 derived from the span temperature compensation circuit 203, 229, 233, and 205 are provided to the offset temperature compensation circuit 237 which in turn provides a combined offset span temperature compensation signal 239.

All of the offsets, slopes, spans and temperature performances of the sensors can be determined during manufacturing and programmed into the signal processing circuit 113 before shipping to provide the necessary compensation to provide an accurate absolute pressure sensor. The signal processing circuit can use analog, or preferably digital, techniques to provide the equalization, offset, span and temperature compensation. In practice, the entire sensor assembly 100 is exposed to two different temperatures to determine the offsets and slopes of the sensors, temperature performance, and drift.

Figure 5:
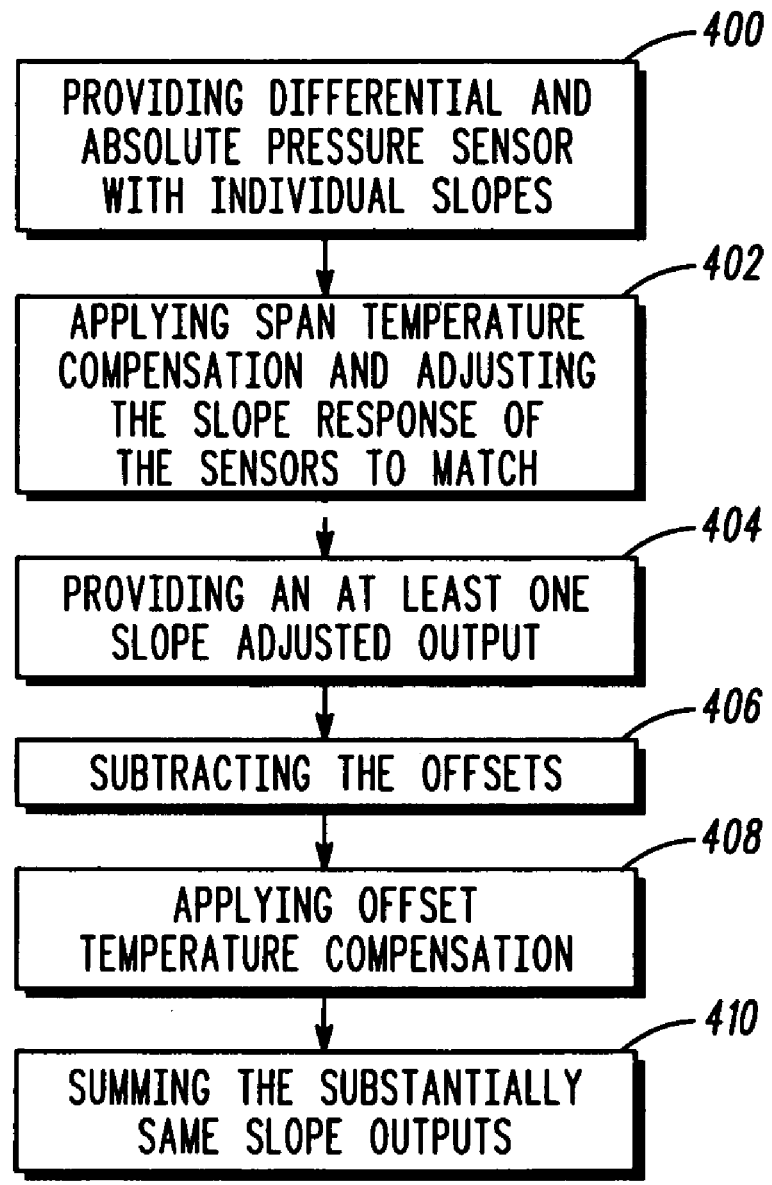
FIG. 5 is a flow chart demonstrating a method in accordance with a preferred embodiment of the invention.

Referring to FIG. 5, the present invention also provides a method for providing an absolute pressure measurement of an isolated media. The method includes a first step 400 of providing a first pressure sensor consisting of a piezo-resistive device operable to measure a first pressure difference between a first pressure and a second pressure applied across the first pressure sensor, as detailed above. The first pressure sensor is responsive to the first pressure difference by providing a first output having a first slope response relative to the first pressure difference. Similarly, a second pressure sensor consisting of a piezo-resistive device operable to measure a second pressure difference between the second pressure and substantially a vacuum applied across the second pressure sensor. The second pressure sensor is responsive to the second pressure difference by providing a second output having a second slope response relative to the second pressure difference.

A next step 402 includes applying span temperature compensation and adjusting the slope response of at least one of the first and second sensors such that the first slope is substantially the same as the second slope. Preferably, the slope response of both the first signal and the second signal are adjusted.

A next step 404 includes providing an at least one adjusted output corresponding of the first and second sensors.

A next step 406 includes subtracting a first and a second offset from the corresponding first and second sensor outputs.

A next step 408 includes applying offset-temperature, derived from the first and second pressure sensors, to provide offset-span temperature-compensation of the first and second sensors.

A next step 410 includes summing the substantially same slope outputs associated with the first and sensor sensors so as to provide an output signal indicative of an absolute pressure measurement of the first pressure.

In conclusion, an improved media-isolated absolute pressure sensor, that is more accurate, easier to manufacture, and has better field performance over time and temperature variations has been detailed. It overcomes the deficiencies of prior art approaches by replacing the hermetic media isolation techniques with a simpler differential/absolute sensor configuration. Furthermore, a simplified approach for calibrating multiple sensors and combining their outputs to electronically form an absolute signal provides a substantial manufacturability and field performance advantage.

While the present invention has been particularly shown and described with reference to particular embodiments thereof, it will be understood by those skilled in the art that various changes may be made and equivalents substituted for elements thereof without departing from the broad scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A media-isolated absolute pressure sensor apparatus comprising:
    a first pressure sensor operable to measure a first pressure difference between a first pressure and a second pressure applied across the first pressure sensor, the first pressure sensor responsive to the first pressure difference by providing a first output having a first slope response relative to the first pressure difference;

a second pressure sensor operable to measure a second pressure difference between the second pressure and substantially a vacuum applied across the second pressure sensor, the second pressure sensor responsive to the second pressure difference by providing a second output having a second slope response relative to the second pressure difference;

at least one equalizer circuit for adjusting the slope response of at least one of the first and second sensors such that the first slope is substantially the same as the second slope, and providing an at least one adjusted output corresponding of the first and second sensors; and a summing circuit for adding the substantially same slope outputs associated with the first and sensor sensors so as to provide an output signal indicative of an absolute pressure measurement of the first pressure.

2. An apparatus in accordance with claim 1 further comprising an offset circuit for providing at least one of a first and second offset signal for the corresponding first and second sensor outputs.

3. An apparatus in accordance with claim 1 further comprising an offset-temperature and span-temperature compensation circuit coupled to each of the first and second pressure sensors for providing an offset-span temperature compensation signal derived from the first and second pressure sensors.

4. An apparatus in accordance with claim 1 wherein the equalizer includes two equalizers, one for each of the first and second sensors.

5. An apparatus in accordance with claim 1 wherein the first pressure sensor is a piezo-resistive device.

6. A media-isolated absolute pressure sensor apparatus comprising:

a first pressure sensor operable to measure a first pressure difference between a first pressure of an isolated media and a second pressure applied across the first pressure sensor, the first pressure sensor responsive to the first pressure difference by providing a first output having a first slope response relative to the first pressure difference;

a second pressure sensor operable to measure a second pressure difference between the second pressure and substantially a vacuum applied across the second pressure sensor, the second pressure sensor responsive to the second pressure difference by providing a second output having a second slope response relative to the second pressure difference;

a first and second equalizer circuit for adjusting the slope response and offset of the respective first and second sensors such that the first slope is substantially the same as the second slope, and providing respective adjusted first and second outputs; and a summing circuit for adding the adjusted first and second outputs so as to provide an output signal indicative of an absolute pressure measurement of the isolated media.

7. An apparatus in accordance with claim 6 further comprising an offset-temperature and span-temperature compensation circuit coupled to each of the first and second pressure sensors for providing an offset-span-temperature-compensation signal derived from the first and second pressure sensors.

8. An apparatus in accordance with claim 6 wherein the first and second pressure sensors are piezo-resistive devices.

9. A method for providing an absolute pressure measurement of an isolated media, the method comprising the steps of:

providing a first pressure sensor operable to measure a first pressure difference between a first pressure and a second pressure applied across the first pressure sensor, the first pressure sensor responsive to the first pressure difference by providing a first output having a first slope response relative to the first pressure difference, and a second pressure sensor operable to measure a second pressure difference between the second pressure and substantially a vacuum applied across the second pressure sensor, the second pressure sensor responsive to the second pressure difference by providing a second output having a second slope response relative to the second pressure difference;

adjusting the slope response of at least one of the first and second sensors such that the first slope is substantially the same as the second slope;

providing an at least one adjusted output corresponding of the first and second sensors; and summing the substantially same slope outputs associated with the first and sensor sensors so as to provide an output signal indicative of an absolute pressure measurement of the first pressure.

10. A method in accordance with claim 9 further comprising the step of:

subtracting a first and a second offset from the corresponding first and second sensor outputs.

11. A method in accordance with claim 10 further comprising the step of:

applying offset-temperature and span-temperature compensation, derived from the first and second pressure sensors, to provide offset-span temperature-compensation of the first and second sensors.

12. A method in accordance with claim 9 wherein the step of adjusting adjusts the slope response of both the first signal and the second signal.

13. A method in accordance with claim 9 wherein the providing step includes providing the sensors as first and second piezo-resistive devices.

* * * * *